US012736168B2

(12) United States Patent
Larsson

(10) Patent No.: US 12,736,168 B2
(45) Date of Patent: Sep. 15, 2026

(54) PIPE LINING TOOL AND CONTROL MODULE

(71) Applicant: PEANTA INVENTIONS AB, Staffanstorp (SE)

(72) Inventor: Peter Larsson, Sjöbo (SE)

(73) Assignee: PEANTA INVENTIONS AB, Sjöbo (SE)

( * ) Notice: Subject to any disclaimer, the term of this patent is extended or adjusted under 35 U.S.C. 154(b) by 6 days.

(21) Appl. No.: 18/560,253

(22) PCT Filed: May 10, 2022

(86) PCT No.: PCT/SE2022/050455
§ 371 (c)(1),
(2) Date: Nov. 10, 2023

(87) PCT Pub. No.: WO2022/240341
PCT Pub. Date: Nov. 17, 2022

(65) Prior Publication Data

US 2024/0240742 A1 Jul. 18, 2024

(30) Foreign Application Priority Data

May 12, 2021 (SE) .................................... 2150610-0

(51) Int. Cl.

| | |
|---|---|
| ***F16L 55/179*** | (2006.01) |
| ***B29C 35/08*** | (2006.01) |
| ***F16L 55/165*** | (2006.01) |

(52) U.S. Cl.
CPC ........ *F16L 55/179* (2013.01); *B29C 35/0805* (2013.01); *F16L 55/1654* (2013.01); *F16L 55/1656* (2013.01); *B29C 2035/0827* (2013.01)

(58) Field of Classification Search
CPC . F16L 55/179; F16L 55/1654; F16L 55/1656; F16L 55/18; F16L 55/265;
(Continued)

(56) References Cited

U.S. PATENT DOCUMENTS

| | | |
|---|---|---|
| 5,501,115 A | 3/1996 | Kamiyama et al. |
| 2002/0033554 A1 | 3/2002 | Heagy et al. |

(Continued)

FOREIGN PATENT DOCUMENTS

| | | |
|---|---|---|
| EP | 0564741 A1 | 10/1993 |
| EP | 2208920 B1 | 2/2012 |

(Continued)

OTHER PUBLICATIONS

International Search Report & Written Opinion of corresponding International Application No. PCT/SE2022/050455; mailed Jul. 25, 2022, 11 pages.

(Continued)

*Primary Examiner* — John L Goff, II
(74) *Attorney, Agent, or Firm* — FisherBroyles, LLP; Douglas P. LaLone

(57) ABSTRACT

A pipe lining tool comprising a bifurcation lining unit comprising a partly flexible main body having an extension in a longitudinal direction and a radial direction. The main body comprises an envelope surface, an envelope opening, and a main body extendable portion. The bifurcation lining unit comprises an air pressure unit. The main body extendable portion being configured to be extended when subject to air pressure from the air pressure unit. The main body comprising a first light emitting diode. The improved light source can be controlled both in order to give sufficient light in a specific wavelength range for curing a liner inside a main pipe, but also for controlling heat emitted by a light source.

16 Claims, 5 Drawing Sheets

(58) Field of Classification Search
CPC ........ B29C 35/0805; B29C 2035/0827; B29C 63/24; B29C 63/28; B29C 63/18; B29C 63/182; B29C 63/185; B29C 63/34; B29C 63/36
USPC .... 156/294, 379.8, 380.9, 423, 272.2, 275.5
See application file for complete search history.

(56) References Cited

U.S. PATENT DOCUMENTS

2005/0092382 A1 5/2005 Muhlin et al.
2020/0049301 A1* 2/2020 Rasmussen ........... F16L 55/179

FOREIGN PATENT DOCUMENTS

EP 3795880 A1 * 3/2021 .............. F16L 55/18
JP 2016107424 A 6/2016
WO 2004104469 A1 12/2004
WO 2018127583 A1 7/2018
WO WO-2018145863 A1 * 8/2018 ......... B29C 63/0004

OTHER PUBLICATIONS

Swedish Search Report Swedish Application No. 2150610-0; mailed Nov. 2, 2021, 2 pages.

* cited by examiner

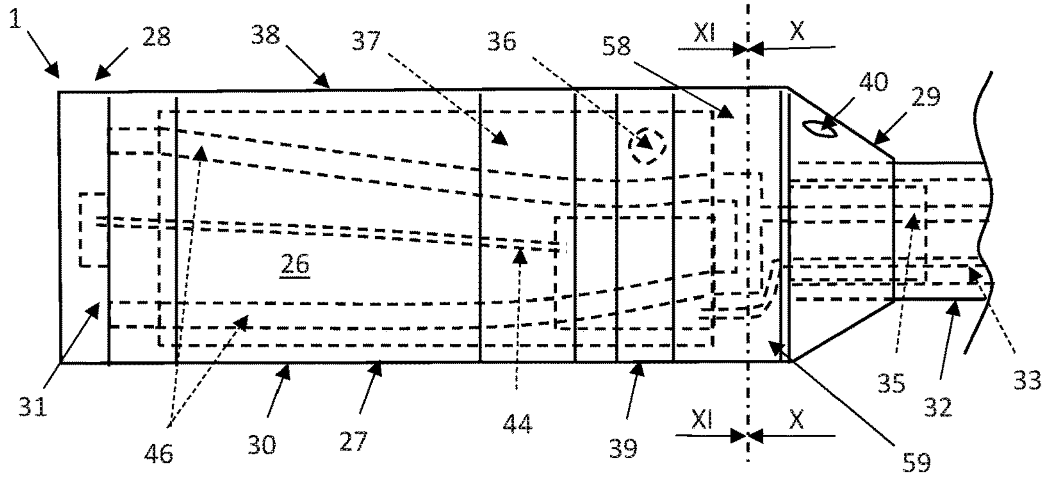
Fig. 9
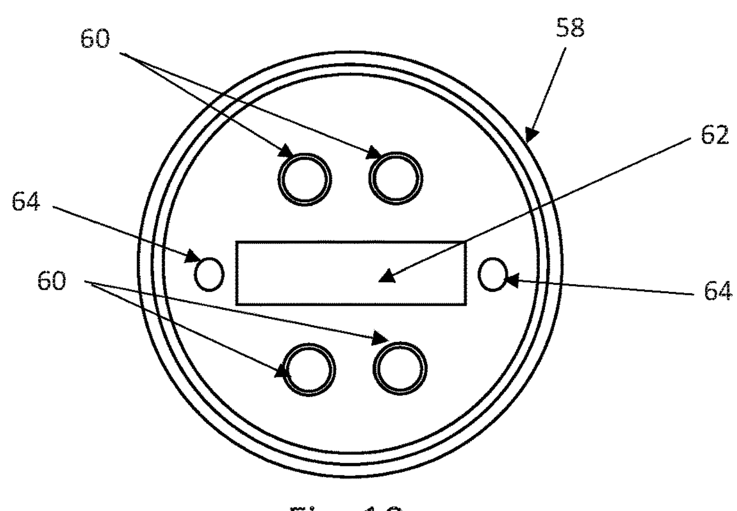
Fig. 10
Fig. 11

PIPE LINING TOOL AND CONTROL MODULE

CROSS-REFERENCE TO RELATED APPLICATIONS

This application is a National Phase application, and it claims priority to PCT/SE2022/050455 which has a filing date of May 10, 2022, which is based on and claims priority to SE 2150610-0 which has a filing date of May 12, 2021, each of which is hereby incorporate by reference in their entirety.

TECHNICAL FIELD

The invention relates to a pipe lining tool comprising a bifurcation lining unit comprising an at least partly flexible main body having an extension in a longitudinal direction and a radial direction being perpendicular to the longitudinal direction. The main body comprises an envelope surface delimiting the main body in the radial direction, the main body comprises a first end portion and an opposing second end portion connected to the envelope surface and delimiting the main body in the longitudinal direction. The main body comprises an envelope opening in the envelope surface configured to align with an opening of a bifurcation pipe extending from a main pipe in which the main body is configured to travel. The main body comprises a main body extendable portion arranged in connection to the envelope opening. The main body extendable portion comprises a third end portion and an envelope surface between the third end portion and the envelope opening. The main body extendable portion is configured to extend into the bifurcation pipe when the main body is positioned such that the envelope opening is aligned with the opening in the bifurcation pipe. The bifurcation lining unit comprises an air pressure unit. The extendable portion is configured to be extended when subject to air pressure from the air pressure unit. The bifurcation lining unit comprises a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion. The invention further relates to a control module connectable to the bifurcation lining unit.

BACKGROUND ART

It is well-known to use a pipe lining tool for relining a main pipe using a light source for curing a liner inside the main pipe. It is further known to use a pipe lining tool for relining a bifurcation pipe extending from the main pipe by use of an apparatus extending a liner into the bifurcation pipe and a light source for curing the liner when in place. One well known problem is that the light source produces light in various wavelengths and heat that has to be controlled.

SUMMARY OF INVENTION

In view of prior art there is a need for an improved light source that can be controlled both in order to give sufficient light in a specific wavelength range for curing the liner, but also for controlling heat emitted by the light source.

The invention relates to a pipe lining tool comprising a bifurcation lining unit comprising an at least partly flexible main body having an extension in a longitudinal direction and a radial direction being perpendicular to the longitudinal direction. The main body comprises an envelope surface delimiting the main body in the radial direction, the main body comprises a first end portion and an opposing second end portion connected to the envelope surface and delimiting the main body in the longitudinal direction. The main body comprises an envelope opening in the envelope surface configured to align with an opening of a bifurcation pipe extending from a main pipe in which the main body is configured to travel. The main body comprises a main body extendable portion arranged in connection to the envelope opening. The main body extendable portion comprises a third end portion and an envelope surface between the third end portion and the envelope opening. The main body extendable portion is configured to extend into the bifurcation pipe when the main body is positioned such that the envelope opening is aligned with the opening in the bifurcation pipe. The bifurcation lining unit comprises an air pressure unit. The extendable portion is configured to be extended when subject to air pressure from the air pressure unit. The bifurcation lining unit comprises a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion. The invention further relates to a control module connectable to the bifurcation lining unit.

The main body comprises a first Light Emitting Diode, LED, unit comprising at least one LED emitting light in the UV wavelength spectrum in connection to the extendable portion configured to illuminate the liner extending portion from an inside of the main body extendable portion when fully extended into the bifurcation pipe.

The advantage of using a LED in the UV wavelength spectrum is that it allows better control of light at a suitable wavelength for curing and at the same time gives control of heat generation.

According to one example, the first LED unit comprises a cooling unit configured to feed air to the first LED unit during use. The cooling unit further ads to the possibility to control heat generated by the light source.

According to one example, the cooling unit is advantageously connected to inlet air from the air pressure unit. One advantage here is that the air pressure unit can be used both for inflating the extendable portion and cooling the light source, i.e. the LED unit.

According to one example, the flexible main body is deflated when inserted into the main pipe and inflated when correctly positioned in connection to the opening of the bifurcation pipe. Here, it should be noted that the flexible main body and consequently the extendable portion is deflated before being inserted such that it is already deflated when inserted. Here, deflated refers to the main body and the extendable portion is subject to a pressure below atmospheric pressure forcing the main body, the extendable portion and the corresponding liner portions to shrink into a suitable form allowing easy passage of the main body and the extendable portion into the main pipe. The deflating pressure can be close to vacuum for allowing the main body and the extendable portion to shrink into a hardened unit being the consequence of the near to vacuum under pressure. The liner positioned on the outside of the extendable portion and the liner positioned on the outside of the main body is advantageously attached to the outside of the respective portions of the extendable portion and the main portions by any suitable means that allows for attachment when deflated and inflated but release of the liner from the extendable and main portions when cured in place. The liner on the outside of the extendable portion and the extendable portion is advantageously tucked, i.e. folded, inwardly into the extendable portion before deflation. When the main body and extendable portion is inflated the tucked in liner and extendable portion untucks from within the extendable portion, i.e. rolls out, from the tucked position to the inflated and an erected position within the bifurcation pipe. Here, the third end portion leads the roll out of the tucked extendable portion and finally rests at the top of the erected and extended extendable portion within the bifurcation pipe. The first LED unit is configured in connection to the third end portion and when the liner and the extendable portion is fully erected, the first LED unit illuminates the liner from within the extendable portion. Hence, the extendable portion is made from a transparent or at least a translucent material allowing UV-light to pass for curing and the liner is made from a material that cures when subject to light from the LED unit or at least comprises components and/or materials that cures when subject to UV light.

According to one example, the main body comprises a second LED unit arranged in connection to the first end portion configured to illuminate the extendable liner in a direction towards the extendable portion and/or a third LED unit arranged in connection to the second end portion configured to illuminate the extendable liner in a direction towards the extendable portion. The second and third LED units are also advantageously arranged to emit UV light, i.e. within the UV Wavelength range. The first and second LED units are advantageously connected to the air pressure unit such that air can be directed through the LED units for cooling the LEDs. Hence, the second and/or third LED units comprise a cooling unit configured to feed air to the LED units during use. The cooling units are advantageously connected to inlet air from the air pressure unit. One advantage here is that the air pressure unit can be used both for inflating the extendable portion and cooling the light source, i.e. the LED unit According to one example, the main body comprises a first connector configured in connection to the second end portion being connectable to a control module.

The invention further relates to a control module connectable to the bifurcation lining unit according to the above. Hence, the pipe lining tool comprises the control module. The control module comprises an elongated housing comprising a first housing end portion and an opposing second housing end portion delimiting the housing in a longitudinal direction and an envelope surface there between delimiting the housing in a radial direction, wherein the first housing end portion comprises a second connector connectable to the main body. The second connector is advantageously connectable to the first connector of the main body via the first connector. The control module comprises connections for electricity and air to be fed from an outside of the control module, through the control module and to the main body and extendable portion of the bifurcation lining unit.

According to one example, the pipe lining tool comprises a semi-flexible connector connected to the second housing end portion, wherein the connector is configured to be able to rotate the control module and the main body when connected. The connector advantageously is configured to house electrical conductors and one or more air conduits being connected to the control module and further connected to the bifurcation lining unit accordingly. Hence, the control module comprises electrical conductors electrically connecting the main body to an external electrical source. The control module further comprises air conduits fluidly connecting the main body and the air pressure units within the main body and the extendable portion to an external air pressure unit.

According to one example, the control module comprises at least one through opening in the envelope surface extending from an inner space in the housing to an outside of the envelope surface and a flexible seal ring configured around the outside of the envelope surface covering the at least one through opening, wherein an air pressure in the housing is regulated by the flexible seal ring.

The at least one through opening is configured to allow return air from the bifurcation lining unit to exit the control module to the surrounding air in the main pipe.

The pipe lining tool comprises a control unit configured to control the LED units and the air pressure units.

According to one example, the pipe lining tool comprises a visual detector, e.g. a camera or the like, positioned in connection to the bifurcation pipe and looking into the pipe for checking position of the extendable portion. The visual detector is advantageously connected to the control unit for an operator to visually control the position and start and control the inflation and then control the illumination and cooling of the LEDs.

The control unit can be any suitable device comprising control functions for operating the devices in the pipe lining tool.

BRIEF DESCRIPTION OF DRAWINGS

The invention will further be explained in connection to a number of drawings, in which.

FIG. 9 schematically shows a side view of a control module;

FIG. 10 schematically shows a front view of a first connector portion along line X-X in FIG. 9, and in which;

FIG. 11 schematically shows a front view of a second connector portion along line XI-XI in FIG. 9.

DETAILED DESCRIPTION

Figure 1:
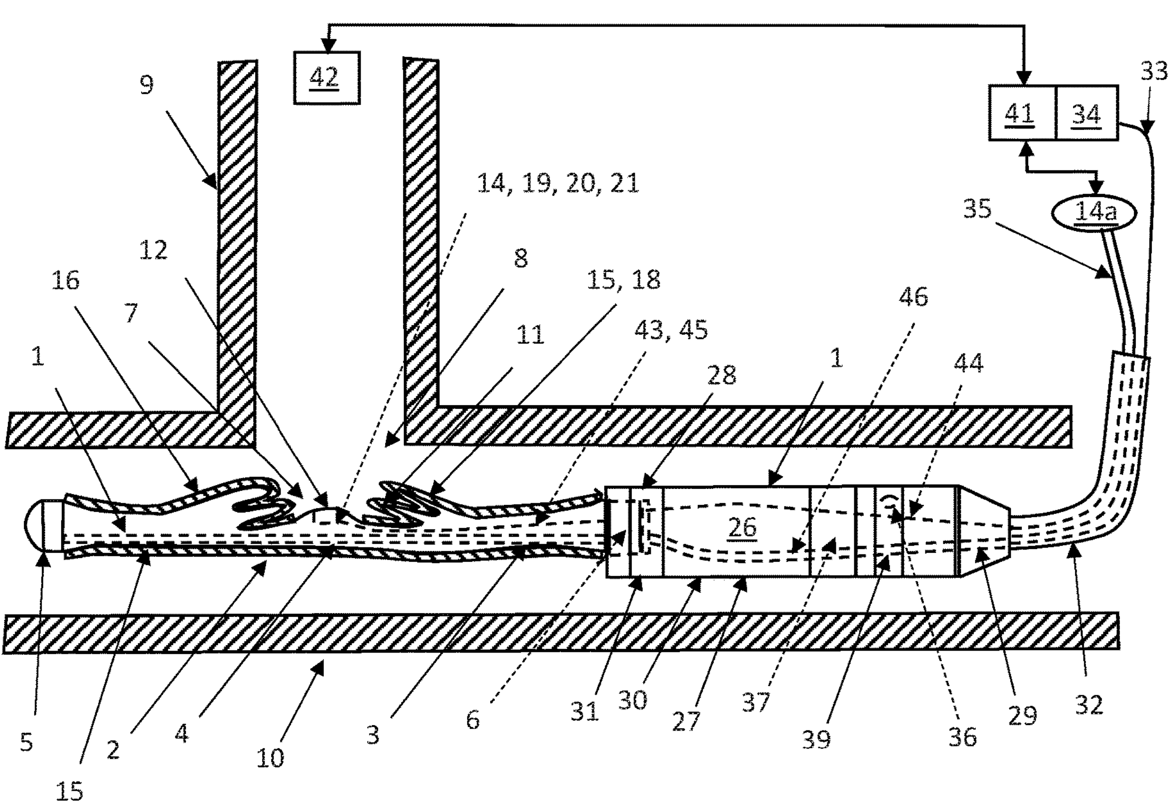
FIG. 1 schematically shows a side view of a pipe lining tool according to the invention in a deflated state in a pipe.

The invention will below be described with a number of examples and some, but not all, examples will be schematically shown in the drawings referred to. In the drawings, same objects will be referred to with like reference numbers. In order to facilitate the description of the invention, some objects are referred to in a cylindrical coordinate system having a longitudinal direction and a radial direction being perpendicular to the longitudinal direction.

Figure 2:
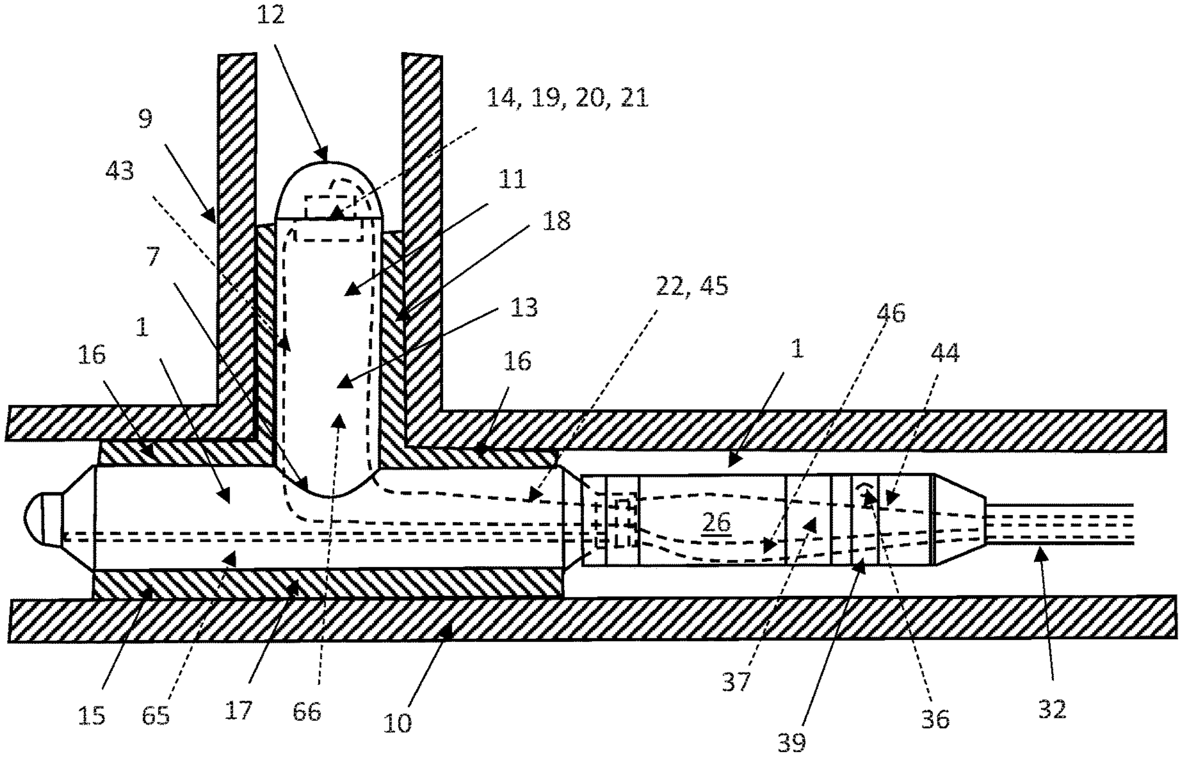
FIG. 2 schematically shows a pipe lining tool according to FIG. 1 in an inflated state.

FIG. 1 schematically shows a side view of a pipe lining tool according to the invention in a deflated state in a main pipe 10 and FIG. 2 schematically shows a pipe lining tool 1 according to FIG. 1 in an inflated state. FIGS. 1 and 2 show a pipe lining tool 1 comprising a bifurcation lining unit 2 comprising an at least partly flexible main body 3 having an extension in a longitudinal direction and a radial direction being perpendicular to the longitudinal direction. The main body 3 comprises an envelope surface 4 delimiting the main body 3 in the radial direction. The main body 3 comprises a first end portion 5 and an opposing second end portion 6 connected to the envelope surface 4 and delimiting the main body 3 in the longitudinal direction. The main body 3 comprises an envelope opening 7 in the envelope surface 4 configured to align with an opening 8 of a bifurcation pipe 9 extending from a main pipe 10 in which the main body 3 is configured to travel. The main body 3 comprises a main body extendable portion 11 arranged in connection to the envelope opening 7. The main body extendable portion 11 comprises a third end portion 12 and an envelope surface 13 between the third end portion 12 and the envelope opening 7. The main body extendable portion 11 is configured to extend into the bifurcation pipe when the main body 3 is positioned such that the envelope opening 7 is aligned with the opening 8 in the bifurcation pipe 9. The bifurcation lining unit 2 comprises an air pressure unit 14. The extendable portion 11 is configured to be extended when subject to air pressure from the air pressure unit 14. The bifurcation lining unit 2 comprises a flexible and extendable liner 15 comprising longitudinally extending liner portions 16 arranged along at least a part of an outside of the main body 3 on either side of the envelope opening 7 and laterally extending liner portions 17 arranged along at least a part of an outside of the main body 3 on either side of the envelope opening 7 interconnecting the longitudinally extending portions around the envelope opening 7 and an extendable liner portion 18 arranged there between in connection to the envelope opening 7 and on an outside of the main body extendable portion 11 configured to extend into the bifurcation pipe 9 together with the main body extendable portion 11. The main body 3 comprises a first Light Emitting Diode, LED, unit 19 comprising at least one LED 20 emitting light in the UV wavelength spectrum in connection to the extendable portion 11 configured to illuminate the liner extending portion 18 from an inside of the main body extendable portion 11 when fully extended into the bifurcation pipe 9.

The advantage of using a LED in the UV wavelength spectrum is that it allows better control of light at a suitable wavelength for curing and at the same time gives control of heat generation.

FIG. 1 shows that the pipe lining tool 1 comprises a control unit 41 configured to control the first LED unit 19 and the air pressure unit 14.

FIG. 1 shows that the pipe lining tool comprises a visual detector 42, e.g. a camera or the like, positioned in connection to the bifurcation pipe 9 and looking into the pipe 9 for checking position of the extendable portion 11. The visual detector 42 is advantageously connected to the control unit 41 for an operator to visually control the position and start and control the inflation and then control the illumination and cooling of the LEDs.

The control unit 41 can be any suitable device comprising control functions for operating the devices in the pipe lining tool.

The control unit 41 and visual detector 42 are not shown in FIGS. 2-6, but is advantageously part of the pipe lining tool 1 in a similar manner as in FIG. 1.

FIGS. 1 and 2 schematically shows a cross-section of the bifurcation pipe 9, the main pipe 10 and the liner portions 16, 17, 18, but the pipe lining tool 1 is schematically shown in its entirety.

Figure 3:
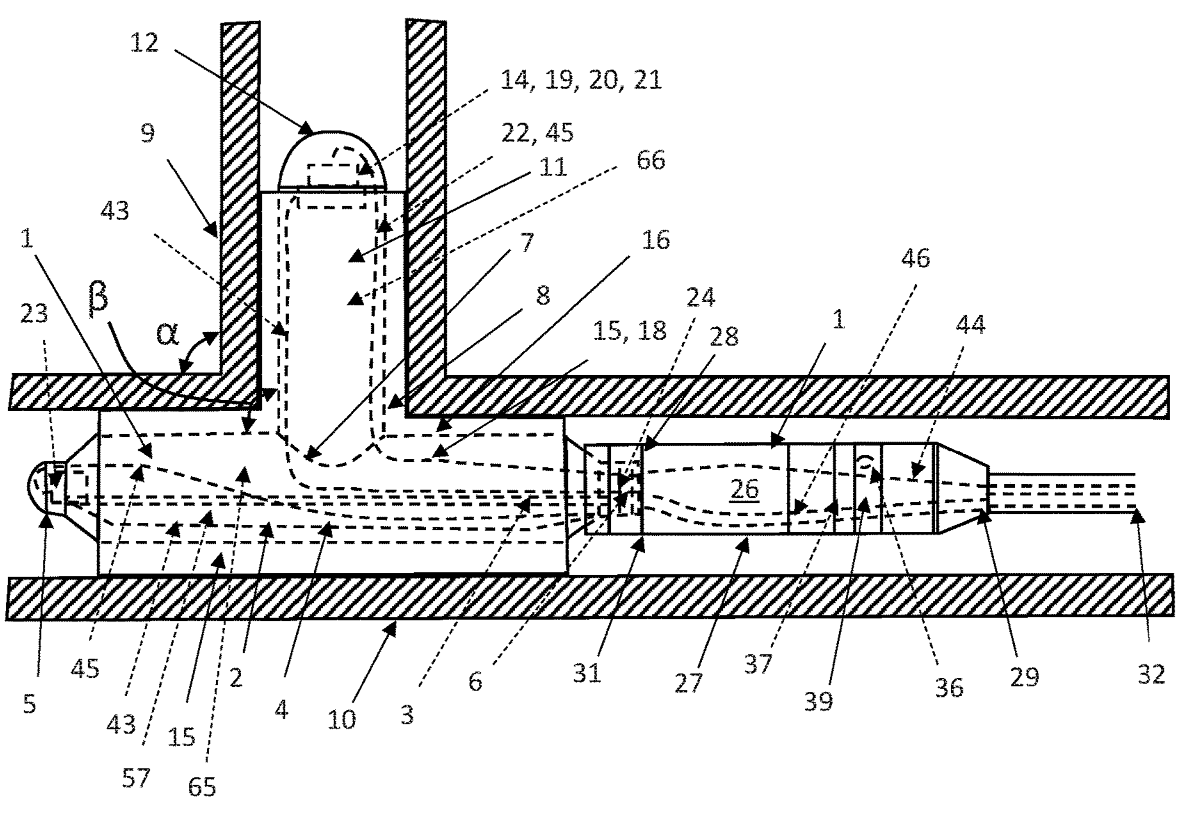
FIG. 3 schematically shows a side view of a pipe lining tool according to the invention in an inflated state in a pipe according to one example.

FIG. 3 schematically shows a side view of a pipe lining tool 1 in an inflated state as shown in FIG. 2, where the longitudinally and laterally extending liner portions 16, 17 are arranged such that they reach all the way around the main body 3.

Figure 4:
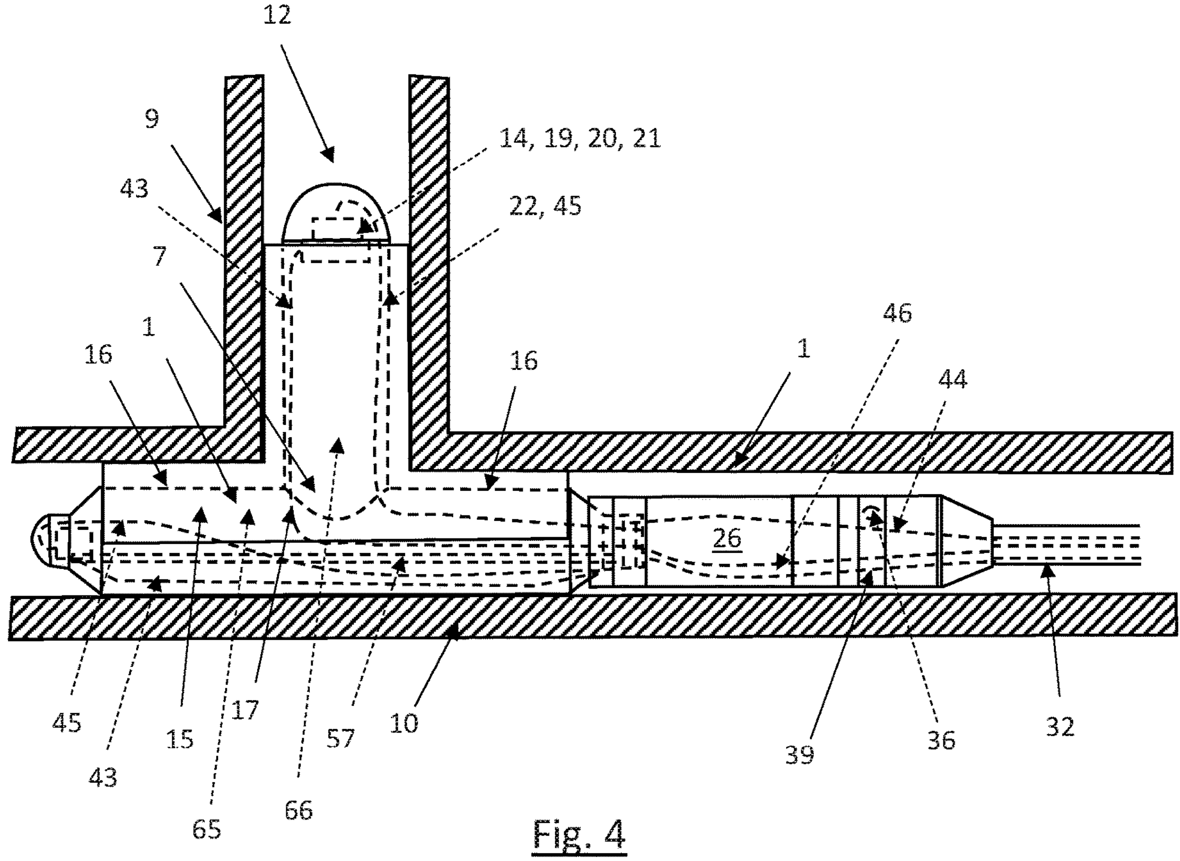
FIG. 4 schematically shows a side view of a pipe lining tool according to the invention in an inflated state in a pipe according to one example.

FIG. 4 schematically shows a side view of a pipe lining tool 1 in an inflated state as shown in FIG. 2, where the longitudinally and laterally extending liner portions 16, 17 are arranged such that they reach only partly around the main body 3.

FIGS. 3 and 4 schematically shows a cross-section of the bifurcation pipe 9 and the main pipe 10, but the liner portions 16, 17, 18 and the pipe lining tool 1 is schematically shown in its entirety.

Figure 5:
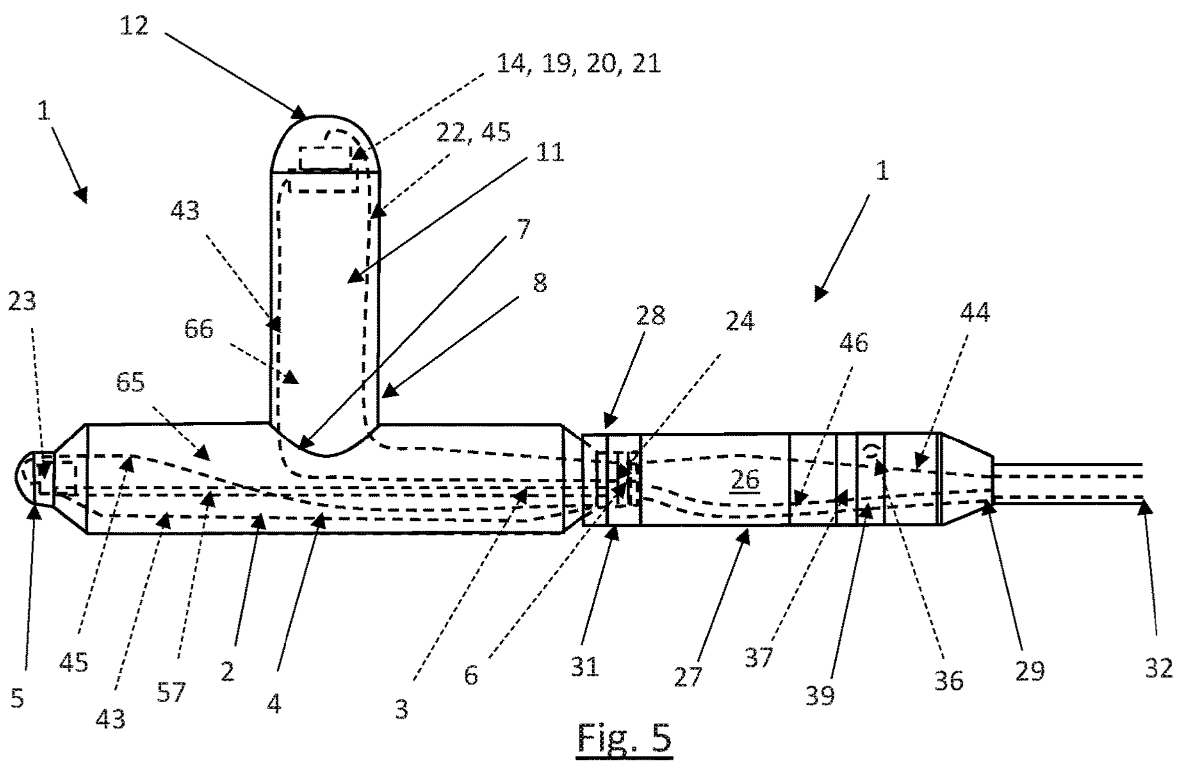
FIG. 5 schematically shows a side view of a pipe lining tool according to the invention with a main body connected to a control module.
Figure 6:
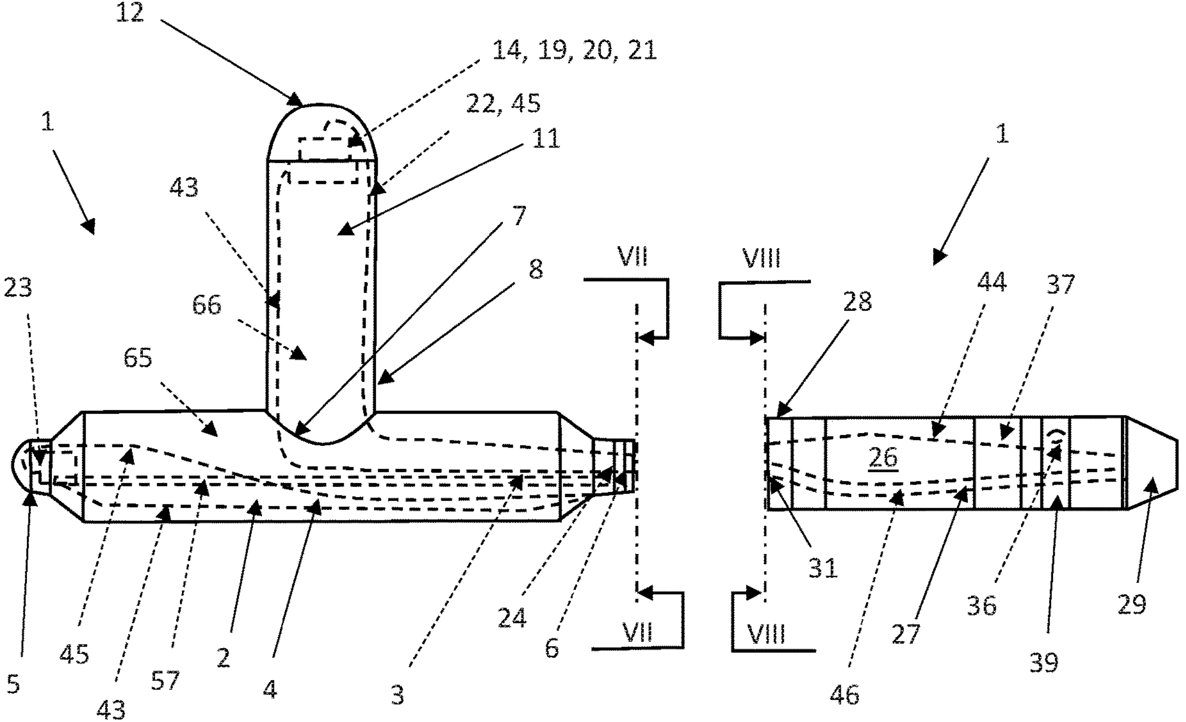
FIG. 6 schematically shows a side view of a pipe lining tool according to the invention with a main body disconnected from a control module.

FIG. 5 schematically shows a side view of a pipe lining tool 1 according to the invention with the main body 3 is connected to the control module 26. FIG. 6 schematically shows a side view of a pipe lining tool 1 according to the invention with the main body 3 disconnected from the control module 26. The above description of the invention in connection to FIGS. 1-4 is valid also on the pipe lining tool 1 shown in FIGS. 5 and 6. FIGS. 5-11 shows the pipe lining tool 1 without the liner, but a liner is intended to be mounted onto the pipe lining tool 1 according to what has been described in connection to any one of FIGS. 1-4.

With reference to FIGS. 1-6, the first LED unit comprises a cooling unit 21 configured to feed air to the first LED unit during use. The cooling unit 21 further ads to the possibility to control heat generated by the light source.

The cooling unit 21 is advantageously connected to inlet air 22 from the air pressure unit 14, 14*a*. One advantage here is that the air pressure unit can be used both for inflating the extendable portion and cooling the light source, i.e. the LED unit.

The flexible main body 3 is deflated when inserted into the main pipe 10, see FIG. 1, and inflated, see FIGS. 2-6 when correctly positioned in connection to the opening 8 of the bifurcation pipe 9. Here, it should be noted that the flexible main body 3 and consequently the extendable portion 11 is deflated before being inserted such that they are already deflated when inserted. Here, deflated refers to the main body 3 and the extendable portion 11 is subject to a pressure below atmospheric pressure forcing the main body 3, the extendable portion 11 and the corresponding liner portions 15, 16, 17, 18 to shrink into a suitable form allowing easy passage of the main body 3 and the extendable portion 11 into the main pipe 10. The deflating pressure can be close to vacuum for allowing the main body and the extendable portion to shrink into a hardened unit being the consequence of the near to vacuum under pressure. The liner 15, 18 positioned on the outside of the extendable portion 11 and the liner 15, 16, 17 positioned on the outside of the main body 3 are advantageously attached to the outside of the respective portions of the extendable portion 11 and the main body 3 by any suitable means that allows for attachment when deflated and inflated but release of the liner from the extendable and main portions when cured in place. The liner 15, 18 on the outside of the extendable portion 11 and the extendable portion 11 is advantageously tucked, i.e. folded, inwardly into the extendable portion 11 before deflation. When the main body 3 and extendable portion 11 are inflated the tucked in liner 15, 18 and extendable portion 11 untucks from within the extendable portion 11, i.e. rolls out, from the tucked position to the inflated and an erected position within the bifurcation pipe. Here, the third end portion 12 leads the roll out of the tucked extendable portion 11 and finally rests at the top of the erected and extended extendable portion 11 within the bifurcation pipe 9. The first LED unit 19 is arranged in connection to the third end portion 12 and when the liner 15, 18 and the extendable portion 11 is fully erected, the first LED unit 19 illuminates the liner 15, 18 from within the extendable portion 11. Hence, the extendable portion 11 is made from a transparent or at least a translucent material allowing UV-light to pass for curing and the liner is made from a material that cures when subject to light from the LED unit 19 or at least comprises components and/or materials that cures when subject to UV light.

According to one example, the main body comprises a second LED unit 23 arranged in connection to the first end portion 5 configured to illuminate the extendable liner 15, 18 in a direction towards the extendable portion 11 and/or a third LED unit 24 arranged in connection to the second end portion 6 configured to illuminate the extendable liner 15, 18 in a direction towards the extendable portion 11. The second and third LED units are also advantageously arranged to emit UV light, i.e. within the UV Wavelength range. The second and third LED units 23, 24 are advantageously connected to the air pressure unit 14, 14*a* in such a way that air can be directed through the LED units 23, 24 for cooling the LEDs in a similar manner as the first LED unit 19 with corresponding cooling units.

According to one example, the main body 3 comprises a first connector 25 configured in connection to the second end portion 6 being connectable to a control module 26.

The invention further relates to a control module 26 connectable to the bifurcation lining unit 2. Hence, the pipe lining tool 1 comprises the control module 26. The control module 26 comprises an elongated housing 27 comprising a first housing end portion 28 and an opposing second housing end portion 29 delimiting the housing in the longitudinal direction and an envelope surface 30 there between delimiting the housing 27 in the radial direction, wherein the first housing end portion 28 comprises a second connector 31 connectable to the main body 3. The second connector 31 is advantageously connectable to the first connector 25 of the main body 3. The control module 26 comprises connections for electricity and air to be fed from an outside of the control module 26, through the control module 26 and to the main body 3 and extendable portion 11 of the bifurcation lining unit 2.

According to one example, the pipe lining tool 1 comprises a semi-flexible connector 32 connected to the second housing end portion 29, wherein the connector 32 is configured to be able to rotate the control module 26 and the main body 3 when connected. The connector 32 is advantageously configured to house electrical conductors 33 and one or more air conduits 35 being connected to the control module 26 and further connected to the bifurcation lining unit 2 accordingly. Hence, the control module 26 comprises electrical conductors 44 electrically connecting the main body 3 to an external electrical source 34. The control module 26 further comprises air conduits 46 fluidly connecting the main body 3 and the air pressure units 14 within the main body 3 and the extendable portion 11 to an external air pressure unit 14*a*.

According to one example, the control module 26 comprises at least one through opening 36 in the envelope surface 30 extending from an inner space 37 in the housing 27 to an outside 38 of the envelope surface 30 and a flexible seal ring 39 configured around the outside 38 of the envelope surface covering the at least one through opening 36, wherein an air pressure in the housing is regulated by the flexible seal ring 39.

The at least one through opening 36 is configured to allow return air from the bifurcation lining unit to exit the control module to the surrounding air in the main pipe.

FIGS. 1-6 and FIG. 8 schematically shows that the pipe lining tool 1 comprises electrical conductors 43 running from the control module 26 to the LED unit 19 or LED units 19, 23, 24 inside the bifurcation lining unit 2 for leading electricity and control signals from the control unit 41 to the LED unit 19 or LED units 19, 23, 24. The pipe lining tool 1 further comprises electrical conductors 44 inside the control module 26 running from the bifurcation lining unit 2 to the electrical conductors 33 connecting the control module 26 to the external electrical source 34 and the control unit 41 for leading electricity and control signals from the control unit 41 and the external electrical source 34 to the LED unit or LED units.

FIGS. 1-6 and FIG. 8 schematically shows that the pipe lining tool 1 comprises air conduits 45 running from the control module 26 to the LED unit or LED units inside the bifurcation lining unit 2 for leading air from the control module 26 to the LED unit 19 or LED units 19, 23, 24 for cooling of the LED units 19, 23, 24 via the cooling units 21. The pipe lining tool 1 further comprises air conduits 46 inside the control module 26 running from the bifurcation lining unit 2 to the air conduits 35 fluidly connecting the control module 26 to the external air pressure unit 14*a* for leading air from the external air pressure unit 14*a* to the air conduits 45 in the bifurcation lining tool 2.

Figure 7:
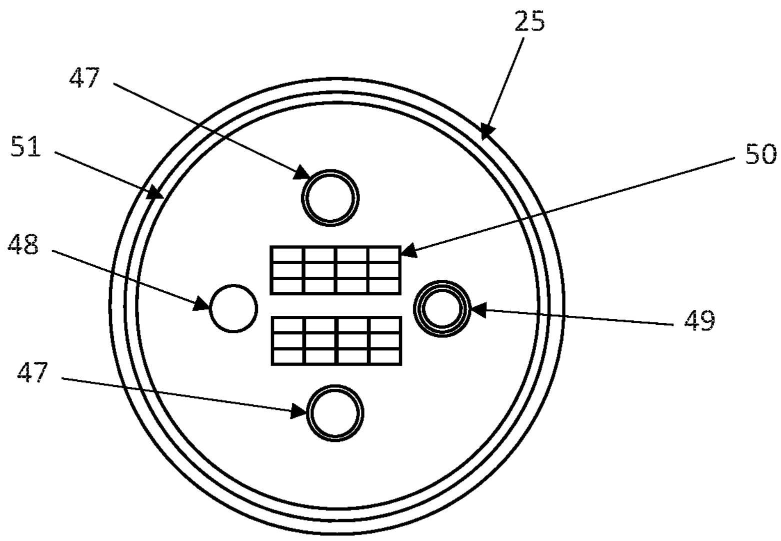
FIG. 7 schematically shows a front view of a first connector of the main body along line VII-VII in FIG. 6.

FIG. 7 schematically shows a front view of the first connector 25 of the main body 3 along line VII-VII in FIG. 6. FIG. 7 shows that the first connector comprises two air pressure connections 47 connected to the air conduits 45 in the bifurcation lining unit 2, i.e. the main body 3. FIG. 7 shows that the first connector 25 comprises a return air through opening 48 for leading air from the main body 3 in the bifurcation lining unit 2 to the control module 26. FIG. 7 shows that the first connector 25 comprises an orientation device 49 configured to guide the control module 26 in a correct position. FIG. 7 shows that the first connector 25 comprises electrical connectors 50 connected to the electrical conductors 43 in the bifurcation lining unit 2 and configured to lead electricity and control signals to and from the control module to and from the electrical conductors 43. FIG. 7 shows that the first connector 25 comprises a sealing unit 51 configured to seal against the control module 26.

Figure 8:
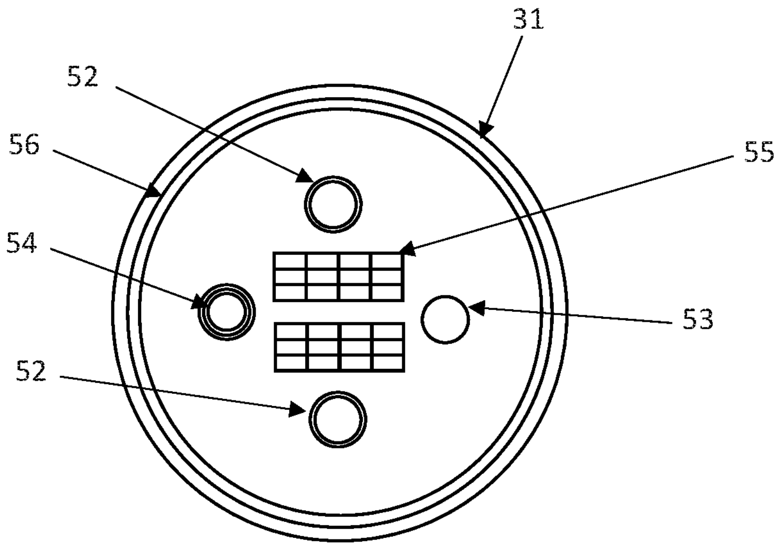
FIG. 8 schematically shows a front view of a second connector of the control module along line VIII-VIII in FIG. 6.

FIG. 8 schematically shows a front view of the second connector 31 of the control module 26 along line VIII-VIII in FIG. 6. The second connector 31 comprises corresponding features as the first connector 25 configured to connect electricity, control signals and air between the main body 3 and the control module 26. FIG. 8 shows that the second connector 31 comprises two air pressure connections 52 connected to the air conduits 46 in the control module 26 and connectable to the air pressure connections 47 in the first connector 25. FIG. 8 shows that the second connector 31 comprises a return air through opening 53 for leading air from the main body 3 in the bifurcation lining unit 2 to the control module 26. The return air opening 53 in the second connector 31 is connectable to the return air opening 48 in the first connector 25. FIG. 8 shows that the second connector 31 comprises an orientation device 54 configured to guide the control module 26 in a correct position with relation to the main body 3 via connection with the orientation device 49 in the first connector 25. FIG. 8 shows that the second connector 31 comprises electrical connectors 55 connectable to the electrical conductors 44 in the control module 26 and configured to lead electricity and control signals to and from the bifurcation lining unit 2 to and from the electrical conductors 44. The electrical connectors 55 in the second connector 31 is connectable to the electrical connectors 50 in the first connector 25. FIG. 8 shows that the second connector 31 comprises a sealing unit 56 configured to seal against the sealing unit 51 in the first connector 25.

FIG. 9 schematically shows a side view of a control module according to the above. FIG. 10 shows that the control module 26 comprises a fastening means 40 configured to hold the control module together when assembled. The fastening means 40 may be any suitable means for securing all parts of the control module in place, for example one or more bolts running in the longitudinal direction.

FIG. 10 schematically shows a front view of a first connector portion 58 along line X-X in FIG. 9, and FIG. 11 schematically shows a front view of a second connector portion 59 along line XI-XI in FIG. 9. FIG. 10 shows that the first connector portion 58 comprises four air channels 60 for compressed air configured to be connected to and feed air to the air conduits 46 in the control module 26. FIG. 11 shows that the second connector portion 59 comprises two air channels 61 configured to feed air from the air conduits 35 connected to the control module 26 via the semi-flexible connector 32. The two air channels 61 in the second connector portion 59 are each of a size that covers two air channels 60 in the first connector portion 58 in FIG. 10. Hence, the first and second connector portions 58, 59 can be used to split one or more air streams from one or more air conduits 35 connected to the control module 26 via the semi-flexible connector 32 into a number of air channels 60 in the first connector portion 58 and corresponding number of air conduits 46 in the control module 26. As an alternative, the first and second connector portions 58, 59 can be used to limit the number of air channels 60 in the first connector portion 58 compared to in the second connector portion 58.

Following the air conduits 46 from the first connector portion 58 to the second connector 31 of the control module 26, also the second connector 31 may comprise channels splitting or bringing together different air conduits 46. As an alternative, the air conduits 46 in the control module may be split or brought together in connection to the second connector 31 and/or the first connector portion 58.

FIGS. 10 and 11 further shows fastener channels 64 that could be used by a fastening means 40 as described in connection to FIG. 9.

It should be noted that the number of electrical connectors, electrical conductors, air conduits, air pressure connections, return air openings, orientation devices is not limited to what is shown in the drawings but can be varied dependent on a number of factors, e.g. design, size of pipe, type of material used, air pressure requirements, cooling need, number of LED units and number of LEDs in each LED unit.

Furthermore, FIGS. 1-6 show that the main body comprises a stiffening element 57 arranged between and interconnecting the first and second end portion portions 5, 6 inside the main body 3, configured to keep the main body in a predetermined shape allowing the deflated bifurcation lining unit 2 to be pressed into the main pipe 10 without folding. If the main body 3 is deflated to a near vacuum state, then it is sufficient that the stiffening element 57 is a wire like element since the near vacuum state forces the flexible main body 3 into a stiff state about the wire element forming a stiff unit. The stiffening element may also be a stiff rod or the like.

With reference to all FIGS. 1-11, the main body 3 comprises an inner space 65 delimited by the envelope surface 4 and the first and second end portions 5, 6. The main body extendable portion 11 comprises an inner space 66 delimited by the envelope surface 13 of the extendable portion 11 and the third end portion 12. The two inner spaces 65, 66 are in communication with each other via the envelope opening 7 in the envelope surface 4 of the main body 3. Hence, the extendable portion 11 comprises an open end portion opposite the third end portion 12 being delimited by an edge portion of the envelope surface 13 surrounding the inner space 66 at the open end portion. The envelope opening 7 is in a similar way delimited by an edge portion. The edge portion of the extendable portion 13 is attached in an airtight manner to the corresponding edge portion in the envelope surface 4 of the main body 3 forming an essentially T-shaped inflatable and deflatable unit. Here, T-shaped refers to a form where the extendable portion 11 is attached to the main body 3 in such a way that the extendable portion extend in a direction at an angle $\beta$, see FIG. 3, with relation to the longitudinal extension of the main body 3 when inflated and fully erected. The bifurcation pipe 9 extends in a similar way at an angle $\alpha$, see FIG. 3, with relation to the main extension of the main pipe 10. The angle $\beta$ depends on the angle $\alpha$ and could be exactly the same or somewhat larger or smaller as long as the extendable portion 11 extend into the bifurcation pipe in a suitable manner. All FIGS. 1-6 show that the angles $\beta$ and $\alpha$ are 90 degrees, but the angles can be less than 90 degrees but significantly larger than zero. In normal practise today bifurcation pipes are known to be at an angle $\alpha$ of 30, 45 or 90 degrees, but is not limited to these examples. It should be noted that less than 90 degrees refers to when the bifurcation pipe 9 leans to the left when looking at the drawings. Should the bifurcation pipe 9 lean to the right when looking at the drawings, then the angles $\alpha$ and $\beta$ are larger than 90 degrees but significantly less than 180 degrees. With the example above of an angle $\alpha$ of 30 or 45 degrees when leaning to the left, corresponding angles would be 150 and 135 degrees when leaning to the right.

To summarize the invention, the liner 15, 16, 17, 18 is attached to the main body 3 and extendable portion 11 and then the extendable portion 11 with the liner 15, 18 is folded/tucked inwardly into the extendable portion 11, after which the control module 26 is connected to the bifurcation lining unit 2 and the main body 3 and extendable portion 11 are deflated and subject to near vacuum. The pipe lining tool 1 is introduced into the main pipe 10 and the extendable portion 11 positioned correctly with relation to the bifurcation pipe 9 by use of the semi-flexible connector 32. When in place, the main body 3 and extendable portion 11 are inflated into a fully erected extendable portion 11 in the bifurcation pipe 9. When fully erected the LED unit 19 or LED units 19, 23, 24 are turned on and the liner 15, 16, 17, 18 is cured in place. Here, the control unit 41 controls the intensity of the LEDs and also the amount of air fed to the cooling unit 21 for cooling the LEDs. The cooling unit 21 is connected to the LED such that air can pass the LEDs in a suitable way to cool the LEDs. The cooling unit 21 is an arrangement where air from the air pressure unit 14, 14*a*, initially used for inflating the main body 3 and the extendable portion 11, continues to be fed to the cooling unit 21 even after the bifurcation lining unit 2 is fully erected. The air from the air pressure unit 14, 14*a* is advantageously air from the external air pressure unit 14*a* that is guided from the external air pressure unit 14*a*, through the air conduits 35 from the external air pressure unit 14*a* to the control module 26, through the control module 26, through the air conduits 45 in the inner space 65 of the main body 3 and the inner space 66 of the extendable portion 11 to the cooling unit 21. Air from the cooling unit 21 is then fed back to the inner space 37 of the control module 26 via the inner space 66 of the extendable portion 11 and the inner space 65 of the main body 3. When the air is in the inner space 37 of the control module 26, the flexible seal ring 39 releases air to the main pipe 10 via the through opening 36 when the air pressure in the inner space 37 of the control module 26 exceeds a predetermined value.

The invention claimed is:

1. A pipe lining tool comprising a bifurcation lining unit comprising an at least partly flexible main body having an extension in a longitudinal direction and a radial direction being perpendicular to the longitudinal direction, the main body comprising an envelope surface delimiting the main body in the radial direction, the main body comprising a first end portion and an opposing second end portion connected to the envelope surface and delimiting the main body in the longitudinal direction, the main body comprising an envelope opening in the envelope surface configured to align with an opening of a bifurcation pipe extending from a main pipe in which the main body is configured to travel, the main body comprising a main body extendable portion arranged in connection to the envelope opening, the main body extendable portion comprising a third end portion and an envelope surface between the third end portion and the envelope opening, the main body extendable portion being configured to extend into the bifurcation pipe when the main body is positioned such that the envelope opening is aligned with the opening in the bifurcation pipe, the bifurcation lining unit comprising an air pressure unit, the extendable portion being configured to be extended from a tuck inside the main body to extend outside the main body when subject to air pressure from the air pressure unit, the bifurcation lining unit comprising a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion, the main body comprising a first Light Emitting Diode, LED, unit comprising at least one LED emitting light in the Ultraviolet UV wavelength spectrum in connection to the extendable portion configured to illuminate a liner extending portion from an inside of the main body extendable portion when fully extended into the bifurcation pipe, wherein the main body comprises a second LED unit connected to the first end portion configured to illuminate the extendable liner in a direction towards the extendable portion and/or a third LED unit connected to the second end portion configured to illuminate the extendable liner in a direction towards the extendable portion.

2. A pipe lining tool according to claim 1, wherein the first LED unit comprises a cooling unit configured to feed air to the first LED unit during use.

3. A pipe lining tool according to claim 2, wherein the cooling unit is connected to inlet air from the air pressure unit.

4. A pipe lining tool according to claim 1, wherein the at least partly flexible main body is deflated when inserted into the main pipe and inflated when correctly positioned in connection to the opening of the bifurcation pipe.

5. A pipe lining tool according to claim 1, wherein the first LED unit is configured in connection to the third end portion.

6. A pipe lining tool according to claim 1, wherein the main body comprises a first connector configured in connection to the second end portion being connectable to a control module.

7. A pipe lining tool according to claim 1, wherein the main body is made from a material that allows light from an LED unit to reach the liner for curing.

8. A pipe lining tool according to claim 1, wherein the liner is made from a material that cures when subject to light from an LED unit.

9. A pipe lining tool according to claim 6, wherein the control module comprises an elongated housing comprising a first housing end portion and an opposing second housing end portion delimiting the housing in the longitudinal direction and an envelope surface there between delimiting the housing in the radial direction, wherein the first housing end portion comprises a second connector connectable to the main body.

10. A pipe lining tool according to claim 9, wherein the air pressure unit comprises a semi-flexible air conduit connected to the second housing end portion, wherein the air conduit is configured to be able to rotate the control module and the main body when connected.

11. A pipe lining tool according to claim 9, wherein the control module comprises electrical conductors electrically connecting the main body to an external electrical source.

12. A pipe lining tool according to claim 9, wherein the control module comprises air conduits fluidly connecting the main body to an external air pressure unit.

13. A pipe lining tool comprising:

a bifurcation lining unit comprising an at least partly flexible main body having an extension in a longitudinal direction and a radial direction being perpendicular to the longitudinal direction, the main body comprising an envelope surface delimiting the main body in the radial direction, the main body comprising a first end portion and an opposing second end portion connected to the envelope surface and delimiting the main body in the longitudinal direction, the main body comprising an envelope opening in the envelope surface configured to align with an opening of a bifurcation pipe extending from a main pipe in which the main body is configured to travel, the main body comprising a main body extendable portion arranged in connection to the envelope opening, the main body extendable portion comprising a third end portion and an envelope surface between the third end portion and the envelope opening, the main body extendable portion being configured to extend into the bifurcation pipe when the main body is positioned such that the envelope opening is aligned with the opening in the bifurcation pipe, the bifurcation lining unit comprising an air pressure unit, the extendable portion being configured to be extended when subject to air pressure from the air pressure unit, the bifurcation lining unit comprising a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion, the main body comprising a first Light Emitting Diode, LED, unit comprising at least one LED emitting light in the Ultraviolet UV wavelength spectrum in connection to the extendable portion configured to illuminate a liner extending portion from an inside of the main body extendable portion when fully extended into the bifurcation pipe, and a control module comprising an elongated housing comprising a first housing end portion and an opposing second housing end portion delimiting the housing in the longitudinal direction and an envelope surface there between delimiting the housing in the radial direction, wherein the first housing end portion comprises a second connector connectable to the main body, wherein the control module comprises at least one through opening in the envelope surface extending from an inner space in the housing to an outside of the envelope surface and a flexible seal ring configured around the outside of the envelope surface covering the at least one through opening, wherein an air pressure in the housing is regulated by the flexible seal ring.

14. A pipe lining tool according to claim 13, wherein the at least one through opening is configured to allow return air from the bifurcation lining unit to exit the control module to the surrounding air in the main pipe.

15. A pipe lining tool comprising:

a bifurcation lining unit comprising a entirely flexible main body having an extension in a longitudinal direction and a radial direction being perpendicular to the longitudinal direction, the main body including:

an envelope surface delimiting the main body in the radial direction, a first end portion and an opposing second end portion connected to the envelope surface and delimiting the main body in the longitudinal direction, an envelope opening in the envelope surface configured to align with an opening of a bifurcation pipe extending from a main pipe in which the main body is configured to travel, a main body extendable portion arranged in connection to the envelope opening, the main body extendable portion comprising a third end portion and an envelope surface between the third end portion and the envelope opening, the main body extendable portion being configured to extend into the bifurcation pipe when the main body is positioned such that the envelope opening is aligned with the opening in the bifurcation pipe, the bifurcation lining unit comprising an air pressure unit, the extendable portion being configured to be extended when subject to air pressure from the air pressure unit, the bifurcation lining unit further comprising a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion, the main body comprising a first Light Emitting Diode, LED, unit comprising at least one LED emitting light in the Ultraviolet UV wavelength spectrum in connection to the extendable portion configured to illuminate a liner extending portion from an inside of the main body extendable portion when fully extended into the bifurcation pipe; and a control module connectable to the bifurcation lining unit, wherein the control module comprises an elongated housing comprising a first housing end portion and an opposing second housing end portion delimiting the housing in the longitudinal direction and an envelope surface there between delimiting the housing in the radial direction, wherein the first housing end portion comprises a second connector connectable to the main body, wherein the control module further comprises at least one through opening in the envelope surface extending from an inner space in the housing to an outside of the envelope surface and a flexible seal ring configured around the outside of the envelope surface covering the at least one through opening, wherein an air pressure in the housing is regulated by the flexible seal ring.

16. A pipe lining tool comprising:

a bifurcation lining unit comprising a flexible main body having an extension in a longitudinal direction and a radial direction being perpendicular to the longitudinal direction, the main body including:

an envelope surface delimiting the main body in the radial direction, a first end portion and an opposing second end portion connected to the envelope surface and delimiting the main body in the longitudinal direction, an envelope opening in the envelope surface configured to align with an opening of a bifurcation pipe extending from a main pipe in which the main body is configured to travel, a main body extendable portion arranged in connection to the envelope opening, the main body extendable portion comprising a third end portion and an envelope surface between the third end portion and the envelope opening, the main body extendable portion being configured to extend into the bifurcation pipe when the main body is positioned such that the envelope opening is aligned with the opening in the bifurcation pipe, the bifurcation lining unit comprising an air pressure unit, the extendable portion being configured to be extended when subject to air pressure from the air pressure unit, the bifurcation lining unit further comprising a flexible and extendable liner comprising longitudinally extending liner portions arranged along at least a part of an outside of the main body on either side of the envelope opening and laterally extending liner portions arranged along at least a part of an outside of the main body on either side of the envelope opening interconnecting the longitudinally extending portions around the envelope opening and an extendable liner portion arranged there between in connection to the envelope opening and on an outside of the main body extendable portion configured to extend into the bifurcation pipe together with the main body extendable portion, the main body comprising a first Light Emitting Diode, LED, unit comprising at least one LED emitting light in the Ultraviolet UV wavelength spectrum in connection to the extendable portion configured to illuminate a liner extending portion from an inside of the main body extendable portion when fully extended into the bifurcation pipe; and a control module comprising at least one through opening in an envelope surface extending from an inner space in a housing to an outside of the envelope surface and a flexible seal ring configured around the outside of the envelope surface covering the at least one through opening, wherein an air pressure in the housing is regulated by the flexible seal ring, wherein the at least one through opening is configured to allow return air from the bifurcation lining unit to exit the control module to surrounding air in the main pipe.

* * * * *